(No Model.)
F. E. KITZMILLER.
HITCHING STRAP HOLDER.
No. 305,082. Patented Sept. 16, 1884.
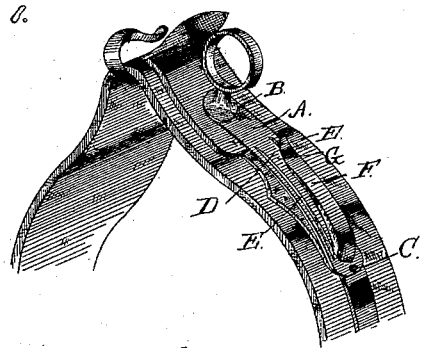
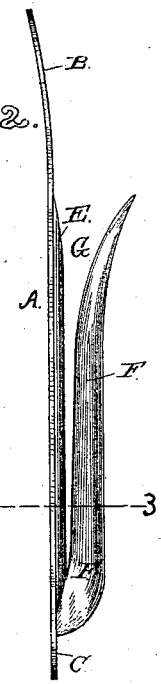
Witnesses:
Elliott P. Hough
C. E. Jones.
Inventor:
Frank E. Kitzmiller
By Chas J. Gooch
his attorney

UNITED STATES PATENT OFFICE.

FRANK E. KITZMILLER, OF PIQUA, OHIO.

HITCHING-STRAP HOLDER.

SPECIFICATION forming part of Letters Patent No. 305,082, dated September 16, 1884.

Application filed January 23, 1884. (No model.)

*To all whom it may concern:*

Be it known that I, FRANK E. KITZMILLER, a citizen of the United States of America, residing at Piqua, in the county of Miami and State of Ohio, have invented certain new and useful Improvements in Hitching-Strap Holders, of which the following is a specification, reference being had therein to the accompanying drawings.

This invention consists of an attachment to be applied to harness-saddles for the purpose of serving as a hitching-strap holder. The attachment consists of a base-plate of either straight or curved form, to adapt it to conform to the curve of a saddle, and having at each end suitable holes to facilitate its ready attachment to a saddle. Extending forwardly from near the rear end and at or near each edge thereof on its top face is a ridge or corrugation and a central concavity. From or near the rear end of this base-plate extends upwardly and forwardly along the path of the ridges or corrugations and central concavity a curved arm or hook which is triangular in cross-section, the ridge of its triangularity depending over the central concavity in the base-plate, in order that when the end of the hitching-strap, which, when in use, is attached to the hitching-post, is passed down the throat of the device, the triangularity of the arm will force said strap down and compress it within the central concavity, and also grip it against the ridges or corrugated edges.

In the drawings, Figure 1 represents in perspective my improved hitching-strap holder as attached to a saddle. Fig. 2 represents a side elevation of the holder, and Fig. 3 represents a cross-section thereof on the line 3 3 of Fig. 2.

A represents the base-plate or bottom piece of my improved hitching-strap holder, which may be of any desired shape to adapt it to conform to the shape or contour of the saddle to which it is to be applied. At the upper end of this bottom plate I usually form a hole or slot, B, through which, as shown in the drawings, the terret can pass, so as to attach the holder to the saddle without necessitating the employment of auxiliary means for that purpose; but other means for the attachment in position of this end of the holder may be employed, if desired.

C represents another hole at the rear or lower end of the base-plate, through which a screw, rivet, or other device is passed for the purpose of attaching that end of the holder in position. In the top face of the base-plate A and centrally thereof I form a concavity, D, which concavity extends forwardly from or nearly from the rear end a portion of the length of the plate.

E E represent corrugations or ridges, one of each of which extends upward from the base-plate at or near each edge thereof, each ridge tapering from its lower end upwardly, as shown.

F represents an arm or hook which extends from the top face of the plate A forwardly along and above the path of the concavity D. This arm is of triangular shape in cross-section, the triangular portion being on its under face and gradually tapering from the rear to the front end, which is curved outwardly and upwardly. By this construction the throat G or space between the arm F and plate A gradually decreases from the front end of said arm rearwardly, and thereby secures a wedge-like action upon a strap inserted therein, and insures said strap being firmly gripped between the arm and base-plate and securely held from displacement by the movement of the animal.

Hitching-straps are attached at one end to the bit or bridle of the harness, and the free end which is tied to the hitching post or rail is usually, when released from such hitch, either tied to some part of the harness or the strap entirely removed from the harness and placed in the vehicle. In the one case, when it is desired to use the strap, time is lost and inconvenience caused in untying the strap to render it serviceable, while in the other case, when the strap is entirely removed, it is not only apt to get lost or misplaced and time lost in searching for it, but time is also lost in attaching it to the harness, when found, before it can be rendered effective. By my device all that is necessary to secure the hitching-strap in position in readiness for use, without either of these inconveniences, is simply to push the free end of said strap down the throat G, where it will be held securely, and can be readily withdrawn when it is desired to use the same. The upward curvature of the front end of the arm F serves as a guide to facilitate the entrance of the strap within the throat G, and by forming the arm on its under face of triangular shape the strap will be forced downward against the side ribs or corrugations and partly within the central concavity, thus crimping or doubling the strap into V form, and securely gripping it within the throat G.

By forming the ribs or corrugations and the triangular under face of the arm of gradual taper the device is adapted to hold straps of varying thickness, and also more than one strap at a time, as the space between the lower face of the arm and the top of the ribs and the concaved portion of the base-plate gradually decreases from their upper or outer to their lower or inner portions, and consequently the farther down the throat G the strap is pushed the more tenacious is the hold secured upon the strap. When a strap is placed within the throat G and forced into binding contact with the arm F and plate A, said strap will be securely held against all movements of the horse or the harness, and cannot be pulled out accidentally.

The device is equally well adapted for use in securing the loose ends of other parts of a harness—such as traces, reins, &c.—as the lines or bands can be pushed down within the throat G and held therein, when it is desired to secure such parts from dropping down and trailing on the ground.

It is designed to make the attachment of some suitable elastic metal, in order that the arm F may spring open to a slight extent when the strap is inserted therein, and operate to compress the strap within the throat when said strap is placed in position therein.

Having thus described my invention, what I claim is—

1. A hitching-strap holder consisting of a plate adapted to be attached to a saddle or other suitable part of a harness, and having tapering side ribs or corrugations, and a forwardly-extending arm having a triangular and rearwardly-tapering under face, substantially as and for the purpose set forth.

2. A hitching-strap holder consisting of a plate adapted to be attached to a saddle or other suitable part of a harness, and having a central concaved portion, tapering side ribs or corrugations bordering said concavity, and a forwardly-extending arm having a triangular and rearwardly-tapering under face, substantially as and for the purpose set forth.

In testimony whereof I affix my signature in presence of two witnesses.

FRANK E. KITZMILLER.

Witnesses:
STEPHEN JOHNSTON,
FRANK EVANS.